(12) United States Patent
Chung

(10) Patent No.: US 7,567,315 B2
(45) Date of Patent: Jul. 28, 2009

(54) LIQUID CRYSTAL DISPLAY MODULE INCLUDING HOOK ASSEMBLY

(75) Inventor: Young-Suk Chung, Gumi-si (KR)

(73) Assignee: LG. Display Co., Ltd., Seoul (KR)

( * ) Notice: Subject to any disclaimer, the term of this patent is extended or adjusted under 35 U.S.C. 154(b) by 602 days.

(21) Appl. No.: 11/300,251

(22) Filed: Dec. 14, 2005

(65) Prior Publication Data
US 2006/0209226 A1    Sep. 21, 2006

(30) Foreign Application Priority Data
Mar. 16, 2005    (KR) .................. 10-2005-0021652

(51) Int. Cl.
*G02F 1/1333*    (2006.01)

(52) U.S. Cl. .......................................... 349/58; 349/60

(58) Field of Classification Search ............... 349/58–60
See application file for complete search history.

(56) References Cited

U.S. PATENT DOCUMENTS

| | | | |
|---|---|---|---|
| 6,971,780 B2 * | 12/2005 | Lee et al. ..................... 362/561 |
| 7,034,913 B2 * | 4/2006 | Ishida ........................ 349/150 |
| 2005/0200770 A1 * | 9/2005 | Kuo et al. ..................... 349/58 |
| 2006/0152664 A1 * | 7/2006 | Nishio et al. ................. 349/150 |

* cited by examiner

*Primary Examiner*—Andrew Schechter
(74) *Attorney, Agent, or Firm*—Brinks Hofer Gilson & Lione

(57) ABSTRACT

A liquid crystal display device includes a liquid crystal display panel, a backlight unit under the liquid crystal display panel, a bottom frame under the backlight unit, a main frame surrounding portions of the liquid crystal display panel and the backlight unit, and a top frame covering top edge portions of the liquid crystal display panel. The top frame is connected to the main frame so that an inner side surface of the top frame is separated from an outer side surface of the main frame.

18 Claims, 2 Drawing Sheets

LIQUID CRYSTAL DISPLAY MODULE INCLUDING HOOK ASSEMBLY

This application claims the benefit of priority under 35 U.S.C. § 119 to Korean Patent Application No. 2005-0021652, filed Mar. 16, 2005, which is hereby incorporated by reference in its entirety.

BACKGROUND OF THE INVENTION

1. Field of the Invention

The present invention relates to a liquid crystal display module, and more particularly, to a liquid crystal display module including top, main and bottom frames.

2. Discussion of the Related Art

A liquid crystal display (LCD) device relies on optical anisotropy and polarizability of liquid crystal molecules to produce an image. Due to the optical anisotropy of liquid crystal molecules, refraction of light incident onto the liquid crystal molecules depends on the alignment direction of the liquid crystal molecules. Liquid crystal molecules are aligned with directional characteristics resulting from their long, thin shapes. The alignment direction of the liquid crystal molecules can be controlled by applying an electric field thereto. An LCD panel includes two substrates and a liquid crystal layer interposed therebetween. The liquid crystal molecules are aligned according to the direction of an electric field generated between electrodes disposed on both substrates of the LCD panel. By refracting and transmitting incident light and controlling the electric field applied to a group of liquid crystal molecules within particular pixel regions, a desired image can be obtained. However, because an LCD panel does not emit light, an LCD module or device requires an additional light source. Accordingly, an LCD module includes a backlight unit disposed below an LCD panel to supply light.

An LCD module according to a related art includes an LCD panel, a backlight unit, a top frame, a main frame and a bottom frame. The backlight unit is disposed under the LCD panel, and the main frame surrounds the LCD panel and the backlight unit. The bottom frame is combined with a bottom surface of the main frame. The top frame is combined with a top surface of the main frame to fix the LCD panel, the main frame and the bottom frame. The top frame covers top edge portions of the LCD panel.

A printed circuit board (PCB) is connected to the LCD panel through a flexible printed circuit board (FPC). The backlight unit includes a lamp (not shown) surrounded by a lamp holder, a reflective plate, a light guide plate on the reflective plate and a plurality of optical sheets covering the light guide plate.

In an LCD device according to the related art, assembling the main frame and the top frame is not easy. Moreover, when combining these two, the main frame may be scratched by the top frame. As a result, particles of the main frame may be generated and the top frame may be altered. A transformation of the top frame may cause an image distortion, including a ripple phenomenon.

SUMMARY OF THE INVENTION

The present invention is directed to a liquid crystal display module obviating problems or limitations of the related art. Accordingly, one objective of the present invention is to provide a liquid crystal display module in which the main frame and top frame are connected without generating particles or transformation.

In one aspect of the present invention, a liquid crystal display device includes a liquid crystal display panel, a backlight unit under the liquid crystal display panel, a bottom frame under the backlight unit, a main frame surrounding the liquid crystal display panel and the backlight unit, and a top frame covering top edge portions of the liquid crystal display panel. The top frame is connected to the main frame so that an inner side surface of the top frame is separated from an outer side surface of the main frame.

In another aspect, the present invention includes a method of making a liquid crystal display device in which the top frame is connected to the main frame so that an inner side surface of the top frame is separated from an outer side surface of the main frame.

DETAILED DESCRIPTION OF THE ILLUSTRATED EMBODIMENTS

Figure 1:
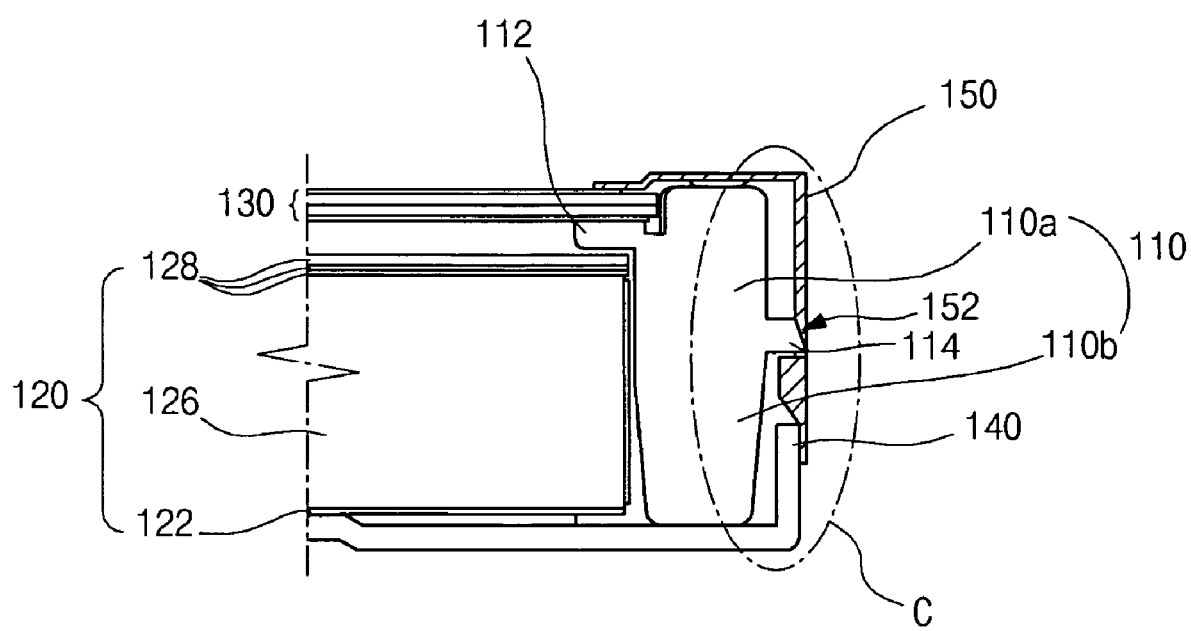
FIG. 1 is a schematic cross-sectional view depicting a liquid crystal display module according to an embodiment of the present invention.

FIG. 1 is a schematic cross-sectional view depicting a liquid crystal display module according to an embodiment of the present invention. In FIG. 1, the liquid crystal display (LCD) module includes an LCD panel 130, a backlight unit 120, a top frame 150, a main frame 110 and a bottom frame 140. The backlight unit 120 is disposed below the LCD panel 130. The main frame 110 surrounds the LCD panel 130 and the backlight unit 120. The bottom frame 140 is connected to a bottom surface of the main frame 110 to prevent an alteration in the main frame 110. The top frame 150 is connected to a top surface of the main frame 110 to fix the LCD panel 130, the main frame 110 and the bottom frame 140. The top frame 150 covers a top edge portion of the LCD panel 130 and surrounds a top surface of the main frame 110, inwardly surrounding a side surface of the main frame 110.

A protrusion 112 at an inner side surface of the main frame 110 divides portions of the LCD panel 130 from the backlight unit 120. The top frame 150 and main frame 110 are connected by a hook assembly, including a first hook 114 and a second hook 152 corresponding thereto. For example, the first hook 114 may be formed on an outer side surface of the main frame 110 and a corresponding second hook 152 may be formed on an inner side surface of the top frame 150. The first hook 114 protrudes from the main frame 110 and the second hook 152 is indented on the top frame 150. The top frame 150 is connected to the main frame 110 by inserting the first hook 114 into the second hook 152.

The first hook 114 divides the main frame 110 into an upper portion 110a and a lower portion 110b. Since the outer side surface of the upper portion 110a is separated from the inner side surface of the top frame 150, the outer side surface of the main frame 110 does not contact the inner side surface of the top frame 150, except in the hook assembly region.

A printed circuit board (PCB) may be connected to the LCD panel 130 through a flexible printed circuit board (FPC) (not shown). The backlight unit 120 may include a lamp (not shown) surrounded by a lamp holder and disposed at one side of the main frame, a reflective plate 122, a light guide plate 126 on the reflective plate 122 and a plurality of optical sheets 128 covering the light guide plate 126. Further, a lamp guide (not shown) may be disposed at one side of the reflective plate 122 to align the lamp.

Figure 2:
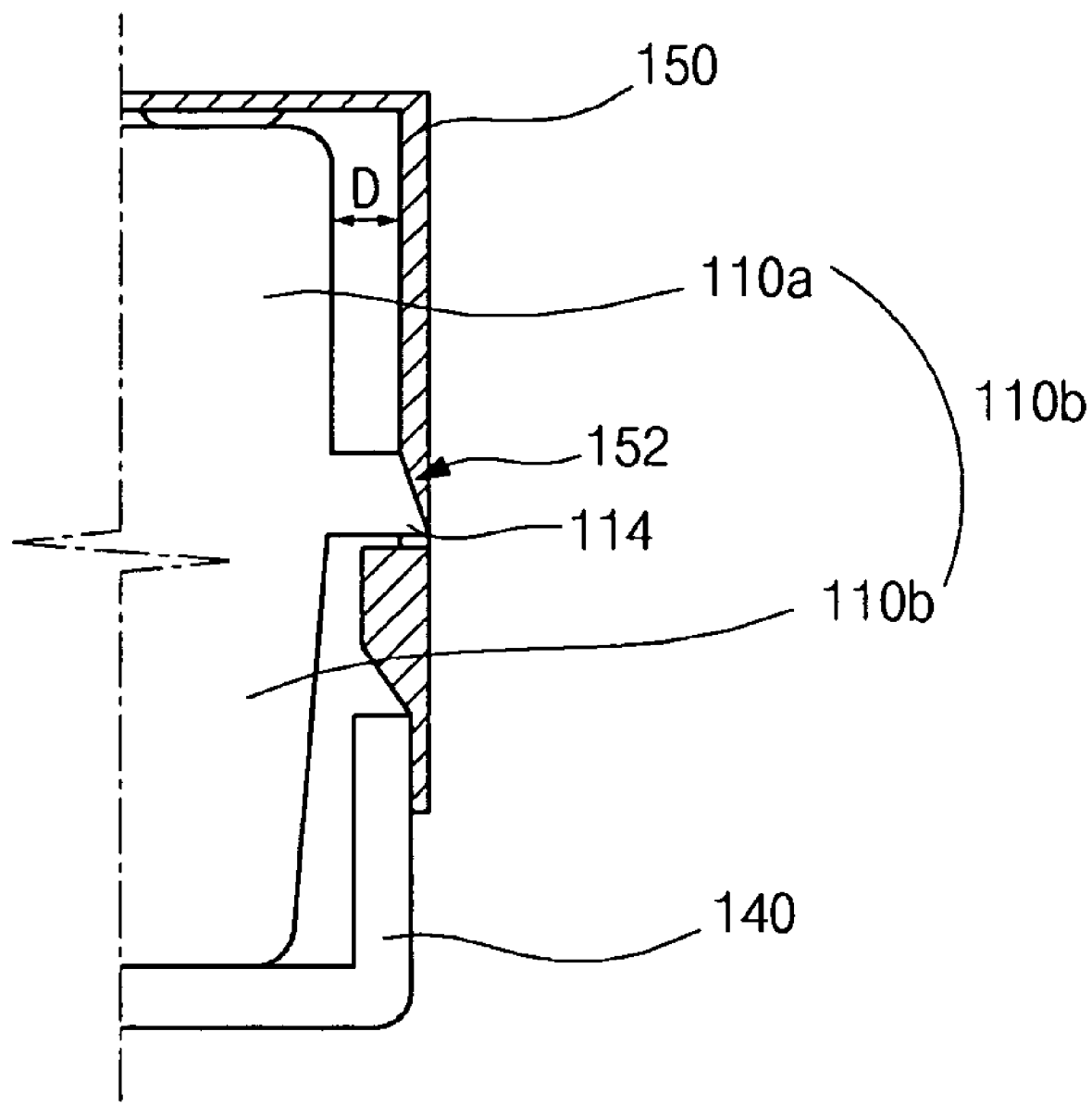
FIG. 2 is a magnified view of portion "C" in FIG. 1.

FIG. 2 is a magnified view of portion "C" in FIG. 1. In FIG. 2, the main frame 110 and the top frame 150 are connected by a hook assembly, and the bottom frame 140 is disposed below the main frame 110 and the top frame 150. The hook assembly may include a first hook 114 protruding from the main frame 110 and a second hook 152 intended on the top frame 150. The first hook 114 defines a border dividing the main frame 110 into an upper portion 110a and a lower portion 110b. The outer side surface of the upper portion 110a is separated from the inner side surface of the top frame 150. Accordingly, the outer side surface of the main frame 110 does not contact the inner side surface of the top frame 150, except in the hook assembly region. The space between the outer side surface of the main frame and the inner side surface of the top frame 150 is defined by a separation space "D." For example, a length of the first hook 114 is substantially the same as a separation distance between the side surface of the main frame 110 and the side surface of the top frame 150. As a result, the second hook 152 of the top frame 150 does not scratch the upper portion 110a of the main frame 110 when the top frame 150 and the main frame 110 are easily combined. The main frame 110 and the top frame 150 can be combined without generating particles or producing alterations in the main frame 110 resulting from scratches between the main frame 110 and the top frame 150. Therefore, an image distortion exemplified by a ripple phenomenon may be prevented.

In an LCD device according to the present invention, the main frame and top frame are easily connected so that a side surface of the main frame is separated from a side surface of the top frame. Accordingly, particle generation and/or transformation due to scratches between the main frame and the top frame may be prevented.

It will be apparent to those skilled in the art that various modifications and variations in the embodiments disclosed in the specification, claims and appended drawings may be made without departing from the spirit or scope of the present invention. Thus, it is intended that the present invention cover these modifications and variations provided they come within the scope of the appended claims and their equivalents.

What is claimed is:

1. A liquid crystal display device, comprising:
    a liquid crystal display panel;
    a backlight unit under the liquid crystal display panel;
    a bottom frame under the backlight unit;
    a top frame covering top edge portions of the liquid crystal display panel, the top frame includes an upper part and a lower part thicker than the upper part; and
    a main frame disposed between the top frame and the bottom frame, wherein the main frame surrounds portions of the liquid crystal display panel and the backlight unit,
    wherein the main frame and the top frame are connected by a hook assembly including a first hook on the main frame and a second hook on the top frame, wherein the upper and lower parts of the top frame are defined by the second hook, and wherein the top frame is connected with the main frame so that an inner side surface of the top frame is separated from an outer side surface of the main frame.

2. The liquid crystal display device according to claim 1, wherein the first hook protrudes from an outer side surface of the main frame and the second hook is indented on an inner side surface of the top frame, and wherein the first hook is inserted into the second hook.

3. The liquid crystal display device according to claim 1, wherein the main frame includes an upper portion above the first hook and a lower portion below the first hook, and wherein a side surface of the upper portion of the main frame is separated from a side surface of the top frame.

4. The liquid crystal display device according to claim 3, wherein a distance between the side surface of the upper portion and the side surface of the top frame is substantially identical to a length of the first hook.

5. The liquid crystal display device according to claim 1, wherein the main frame includes a protrusion on an inner side surface thereof.

6. The liquid crystal display device according to claim 5, wherein a portion of the liquid crystal display panel is disposed above the protrusion, and wherein a portion of the backlight unit is disposed below the protrusion.

7. The liquid crystal display device according to claim 1, wherein the backlight unit further comprises:
    a reflective plate on the bottom frame;
    a light guide plate on the reflective plate;
    a plurality of optical sheets on the light guide plate;
    a lamp disposed at one side of the main frame; and
    a lamp guide aligning the lamp.

8. The liquid crystal display device according to claim 1, wherein the main frame surrounds side surfaces of the backlight unit and the liquid crystal display panel.

9. The liquid crystal display device according to claim 8, wherein the bottom frame wraps a bottom surface of the backlight unit and an outer side surface of the main frame.

10. The liquid crystal display device according to claim 9, wherein the top frame wraps an outer side surface of the main frame.

11. The liquid crystal display device according to claim 10, wherein the top frame contacts a top surface of the main frame.

12. A method of making a liquid crystal display device comprising:
    providing a liquid crystal display panel;
    disposing a backlight unit under the liquid crystal display panel;
    disposing a bottom frame under the backlight unit;
    disposing a main frame over the bottom frame so the main frame surrounds portions of the liquid crystal display panel and the backlight unit; and
    connecting a top frame to the main frame so that the top frame covers a top edge portion of the liquid crystal display panel and so that an inner side surface of the top frame is separated from an outer side surface of the main frame, wherein an outer side surface of the main frame comprises a first hook and an inner side surface of the top frame comprises a second hook, wherein the top frame includes an upper part and a lower part defined by the second hook, and wherein the lower part is thicker than the upper part.

13. The method of claim 12, wherein the step of connecting comprises hooking together the top frame and the main frame.

14. The method of claim 13, wherein the hooking step comprises inserting the first hook into the second hook.

15. The method of claim 14, wherein the step of connecting comprises connecting the top frame and the main frame so that a distance between outer side surface of the main frame and the inner side surface of the top frame is substantially identical to a length of the first hook.

16. The method of claim 12, further comprising providing a protrusion that is disposed on an inner surface of the main frame so that a portion of the liquid crystal display panel is disposed above the protrusion, and so that a portion of the backlight unit is disposed below the protrusion.

17. The method of claim 12, further comprising:
disposing a reflective plate on the bottom frame;
disposing a light guide plate on the reflective plate;
disposing a plurality of optical sheets on the light guide plate;
disposing a lamp guide at one side of the main frame; and
aligning the lamp in the lamp guide.

18. The method of claim 12, comprising wrapping the bottom frame around a bottom surface of the backlight unit and an outer side surface of the main frame, and wrapping the top frame around an outer side surface of the main frame and contacting a top surface of the main frame to the top frame.

* * * * *

UNITED STATES PATENT AND TRADEMARK OFFICE
CERTIFICATE OF CORRECTION

PATENT NO. : 7,567,315 B2 Page 1 of 1
APPLICATION NO. : 11/300251
DATED : July 28, 2009
INVENTOR(S) : Young-Suk Chung It is certified that error appears in the above-identified patent and that said Letters Patent is hereby corrected as shown below:

On the title page,

[*] Notice: Subject to any disclaimer, the term of this patent is extended or adjusted under 35 USC 154(b) by 602 days Delete the phrase "by 602 days" and insert -- by 828 days --

Signed and Sealed this

Twentieth Day of April, 2010

David J. Kappos
*Director of the United States Patent and Trademark Office*